Sept. 26, 1950 E. D. LILJA 2,523,509
LIMIT STOP
Filed Oct. 29, 1947 2 Sheets-Sheet 1

INVENTOR.
Edgar D. Lilja
BY
Carlson, Pitzner, Hubbard & Wolfe
ATTORNEYS

Sept. 26, 1950     E. D. LILJA     2,523,509
LIMIT STOP

Filed Oct. 29, 1947     2 Sheets-Sheet 2

INVENTOR.
Edgar D. Lilja
BY
Carlson, Pitzner, Hubbard & Wolfe
ATTORNEYS

Patented Sept. 26, 1950

2,523,509

UNITED STATES PATENT OFFICE 2,523,509

LIMIT STOP

Edgar D. Lilja, Rockford, Ill., assignor to Barber-Colman Company, Rockford, Ill., a corporation of Illinois Application October 29, 1947, Serial No. 782,764

5 Claims. (Cl. 318—468)

The present invention relates to limit stops and more particularly to devices for limiting the movement of the driven element in a condition responsive system, for example of the floating or proportioning type.

In conventional motor control systems using contacts to control the direction of motor rotation, separate motor windings are used for the two directions of rotation. In such a system the motor may be stopped at the end of its travel by a limit switch which open-circuits the appropriate coil. Since separate coils are used to run the motor in the two directions, the limit switch does not interfere with running the motor back toward its normal position.

Since the requirements for condition responsive systems have become more exacting, control of motors by electrical contacts has, in many instances, been replaced with electronic control. However, when the motor is controlled electronically, particularly in a floating system, stopping the motor at the end of its travel has resulted in additional problems. While it is true that the motor could simply be stalled by using rigid stop pins or the like, this is impracticable except in the case of extremely small motors designed for stalling service. Typical of the motors commonly used with electronic control is a two-phase motor having one winding excited from a constant supply of alternating current, and a second winding excited from the electronic amplifier. Reversal of the motor is accomplished by changing the phase of the current in the second winding, the usual practice being to reverse the phasing, the speed being controlled by varying the magnitude of the current. However, since the same motor winding is used for the two directions of rotation, it is not possible to open-circuit the winding to stop the motor—the motor would then be prevented from running in either direction.

It has been found particularly necessary to limit motor travel in an electronically controlled system in which the amplifier input is obtained from control sources which may under some circumstances exceed predetermined maximum values or in which a high speed or high inertia mechanical load is driven by the motor tending to cause the motor to overtravel considerably beyond its normal limit positions. Even more important is the necessity for stopping the motor at its limits in a floating system in which there is considerable lag between the time that the departure from the desired condition is first detected and the time that the correction is finally made.

Accordingly, it is an object of the invention to provide an improved limit stop particularly suited for use with condition responsive systems of a type having a motor in which speed and direction of rotation are dependent upon the magnitude and sense of the voltage supplied to a single control winding.

It is another object to provide an improved limit stop in which stoppage of the motor is achieved by a superimposed bucking potential which is applied smoothly yet in a rapidly increasing manner as the motor reaches its limits of travel and in which contacts for opening the motor circuit under such circumstances are completely avoided.

It is a related object to provide means for modifying a control system of the floating type in such a manner that an advantageous control characteristic is attained which differs significantly from the floating characteristic in the region of the limits of movement of the responsive member.

It is a further object to provide an improved limit stop in which the motor is controlled to a gradual stop within narrow limits at each end of its travel in spite of the driving of a high inertia load. It is a more detailed object to provide a stopping arrangement in which any tendency to overtravel causes automatic dynamic braking to a degree which is approximately proportional to the amount of overtravel.

It is a general object to provide a limit stop which is simple and straightforward in construction, which is versatile of mounting and adjustment, and which may be easily applied both to new control systems and those which have already been installed.

Other objects and advantages of the invention will be apparent from the following detailed description taken in connection with the accompanying drawings, in which.

Figure 1:
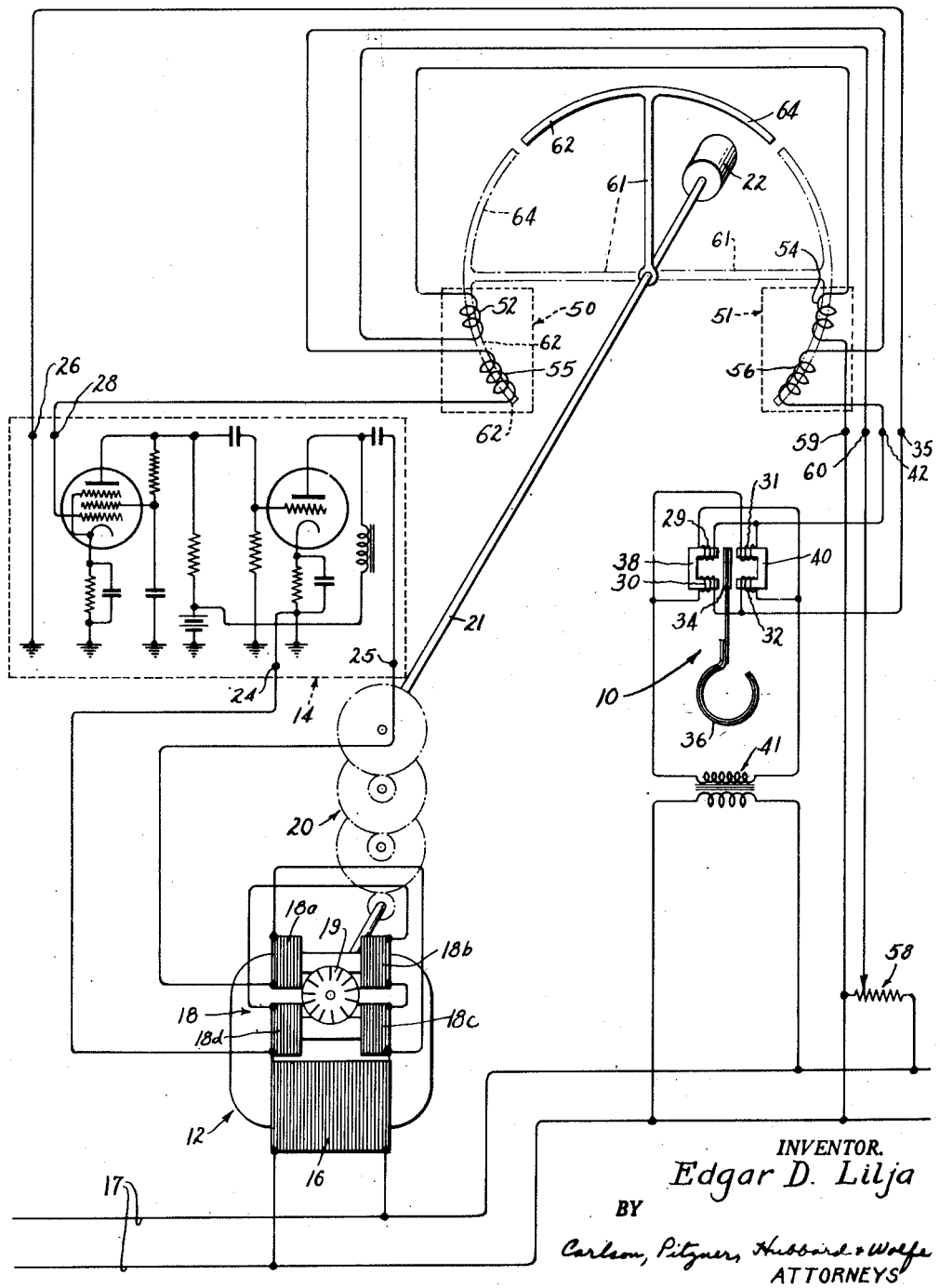
Figure 1 shows one embodiment of the invention applied to an electronically controlled condition responsive system and in which auxiliary control voltage is produced by inductive means at each limit of travel.

While the invention is susceptible of various modifications and alternative constructions and uses, I have shown in the drawings and will herein describe in detail only the preferred embodiments of the invention. It is to be understood, however, that I do not intend to limit the invention by such disclosure, but aim to cover all modifications and alternative constructions and uses falling within the spirit and scope of the invention as expressed in the appended claims.

Referring now to Figure 1 there is shown an exemplary control system employing my improved limit stop. As is conventional in control systems, it includes means for detecting a departure from the desired condition and also means for causing a corrective change to take place. In the present instance the detector includes a thermostat 10, departure from a desired temperature evidencing itself as an A. C. output voltage of a phasing which will produce movement of the corrective means in the proper direction. The corrective portion of the apparatus includes a control motor indicated generally at 12 and an amplifier 14. The motor 12 is of a well known type having a field winding 16 and a control winding 18 which conveniently includes four portions 18a–18d in series. The rotor 19 of the motor drives a gear train 20 which rotates a drive shaft 21 at a considerably reduced speed to position a heat regulator such as a radiator valve 22, combustion controller or the like.

In order to drive the motor in a given direction and at a predetermined speed, current of desired magnitude and phasing is supplied to the control winding 18 from output terminals 24, 25 of the amplifier 14. In general, the speed of the motor will be determined by the amplitude of the current wave while the direction of rotation will be determined by the relative phasing of the amplifier output and the voltage wave in the A. C. line 17. At any instant the voltage output of the amplifier 14 is determined by the voltage applied to the input terminals 26, 28 thereof. The amplifier circuit will not be discussed in detail since many other alternative circuits will be found equally suitable, the only requirement being that a relatively small control voltage at the input terminals produce an amplified output voltage and current sufficient to fully excite the control winding 18 of the motor.

Attention may next be given to the means used for applying a voltage to the amplifier input terminals 26, 28. The main control signal is in the present device derived from inductive windings in the thermostat 10. Mounted within the thermostat 10 is a coiled bimetallic strip 36 which causes a magnetic armature 34 to move in one direction or the other upon changes in the temperature of the surrounding medium. Cooperating with the magnetic armature are two magnetic circuits having cores 38, 40, the armature moving alternatively toward one or the other as the temperature departs from the desired value. On core 38 are coils 29, 30 while core 40 carries corresponding coils designated 31, 32. These four coils are connected in a bridge circuit, each core carrying coils located in the respective opposite legs of the bridge. Current is supplied to the bridge input terminals at a reduced voltage of, say, 25 volts from the secondary of a supply transformer 41.

The bridge output signal is fed to a pair of output terminals 35, 42 which lead to the input terminals 26, 28 of the amplifier 14. In operation, departure of the temperature from the desired value causes movement of the armature 34 to one side of its central position. Upon movement of the armature to the left, for example, it will be apparent that the reluctance of the core 38 will decrease while that of the core 40 will increase. Thus, the inductance of the coils 29, 30, and consequently the voltage drop across them, will rise while the inductance of the coils 31, 32 and voltage across their terminals will fall. Since, with the coils connected as shown, the resulting change in the bridge output voltage is cumulative, a voltage will appear across the output terminals 35, 42 which is a sensitive and positive indication that the temperature should be corrected.

Using only components thus far described, application of such voltage to the amplifier input terminals will cause rotation of motor 12 in a direction to produce corrective adjustment of the valve 22. This rotation will continue until such time as the change in amount of heat being admitted causes the temperature to be restored to the desired value. The speed of motor rotation will, however, vary: When the temperature has departed considerably from its desired value, the voltage applied to the amplifier, and therefore to the motor 12, will be relatively great, resulting in a rapid change in the amount of heat being admitted. Conversely, as the bimetal strip returns to its desired equilibrium position, less and less voltage will be applied to the motor and it will finally come to a stop.

The system will not remain long in this condition, however, since the temperature, as a result of repositioning the heat regulator 22, will next vary in the opposite sense with the result that the regulator 22 will be driven in the opposite direction. As is peculiar to a floating control system of the general type illustrated, the temperature will oscillate or hunt about the desired condition. If the thermal lag is not excessive and if the heat flow from the space being controlled is fairly uniform, it is often possible to keep the temperature within a few degrees of the desired value.

Unfortunately, a simple floating system such as that outlined is subject to a number of rather serious drawbacks which in many instances have made it necessary to resort to much more complicated arrangements. One serious disadvantage is that the control motor 12 will continue to turn as long as the temperature is not up to the desired value until the motor 12 or valve 22 is jammed against its endstop. Such a condition is frequently encountered in systems where there is considerable lag from the time that heat is called for and until an adequate amount is supplied. As an additional aggravating factor, a very sudden change in temperature may take place due to the opening of a door, for example, which will cause the bimetal to move all the way to the right or left. The resulting severe unbalance of the bridge will cause the motor to be fully energized and to be driven at full speed against its endstop. If there is a normal amount of inertia in the mechanical system, there is serious danger of either jamming the drive so that it will refuse to move in the opposite direction with the power available, or of straining one or more of the parts. Then too, such operation is likely to cause objectionable overheating of the motor windings which are normally not designed for sustained stalling.

Attempts to solve this problem, especially where motors of substantial power are employed, have involved the use of limit switches for either opening one of the motor terminals or one of the amplifier input terminals and thereby de-energizing the motor at a predetermined limit position. Such devices have met with moderate success in the case of motors having separate "forward" and "reverse" control windings, since opening one of the windings with a limit switch would not prevent the motor from being returned to a central position by means of the opposite winding. Limit switches, however, are inapplicable in systems employing motors having but a single control winding since, as previously mentioned, open-circuiting such winding prevents the motor from running in either direction. It may be noted in passing that even in those systems where limit switches may be employed the results are often far from satisfactory since the mere opening of the motor circuit will not prevent a high inertia load or motor rotor from carrying the driven shaft far beyond its normal limit position. Moreover, limit contacts are subject to excessive erosion, high resistance failures and the like, and may constitute an explosion hazard.

In accordance with the present invention means are provided for superimposing upon the control signal a bucking voltage which rises steeply with any displacement of the driven shaft 21 beyond a predetermined position at either one of its limits of angular rotation. As shown in Fig. 1 two sources of bucking voltage are used, a first source 50 to limit rotation in a counterclockwise direction and a second source 51 to limit rotation in a clockwise direction. Each of the devices 50, 51 includes inductive means for producing an output voltage which rises sharply with the displacement of the shaft. In the present instance each includes a transformer having primary windings 52, 54 and secondary windings 55, 56 respectively. The primary windings are arranged in series, the voltage supplied thereto being a portion of the voltage appearing on the A. C. line 17 and as determined by the setting of a potentiometer 58. The terminals leading from the potentiometer 58 have, for purposes of convenience, been designated as 59, 60.

Normal coupling between the primary coils and the secondary coils may be made so small as to be practically negligible. I prefer, however, to arrange the secondary coils in series and opposed to one another so that any parasitic voltages induced by airborne flux may be nullified. In the practice of the invention a limit stop arm 61 is rotatively coupled to the shaft 21 for increasing the coupling between the primary and secondary coils at its extremes of movement. In the exemplary embodiment the limit stop arm 61 includes a pair of magnetic plungers 62, 64 which are so arranged as to be progressively inserted within the coils. The secondaries 55, 56 are not only in series with each other but in series with the output terminals 35, 42 of the thermostat bridge circuit. The resultant voltage which is applied to the amplifier input terminals 26, 28 is, therefore, dependent only upon the voltage derived from the thermostat 10 during the major portion of the range of angular movement of the shaft 21; but, as the shaft 21 moves into one of its limit positions, an auxiliary bucking voltage is produced, preventing the motor 12 from being further advanced in the same direction. In accomplishing this it is necessary, of course, that the transformer secondary coils 55, 56 be so connected that their output voltages are opposite in phase to the control voltages tending to drive the driven shaft 21 in the corresponding limit direction.

The amount of bucking voltage required to "take over control" and produce stoppage of the driven shaft at each limit of travel will be determined by a number of factors, primarily of which are the inertia and friction of the load, the voltage-torque characteristics of the combined motor and amplifier, and the maximum voltage output of the thermostat encountered in normal use. While the required bucking voltage may be calculated by one skilled in the art with the above factors in mind, it has been found more satisfactory as a practical matter to correctively adjust the potentiometer 58 which supplies the necessary exciting voltage to the limit devices 50, 51. A setting of the potentiometer 58 will be readily noted which will cause the system to come to a stop within a narrow limit region at each end of the path of travel.

The magnetic characteristics of the plunger arms 62, 64 and the shape of the arms determine to a large extent the voltage gradient of the bucking voltage produced in the secondary coils 52, 54. While both of these factors may be readily determined by trial and adjustment, it has been found that using a soft steel plunger of constant cross section as shown in the drawing together with narrow, pie-wound coils a voltage gradient is obtained which is sufficiently high so as to insure the stoppage of the driven shaft 24 within a few degrees or less of a predetermined limit position.

The arrangement shown includes an inherent advantage which is lacking in conventional limit stops and which is particularly valuable in control systems in which the regulator has considerable inertia or in which it is necessary to run the driven shaft from one extreme position to the other very rapidly. This advantage resides in the dynamic braking characteristics, in other words, the tendency for the motor to be driven in the opposite direction from which it may be coasting due to the inertia of the load. This will be made clear by a consideration of the conditions existing as the shaft is turned a maximum amount in the counterclockwise direction and as the plunger 62 is increasingly inserted into the coils 52, 55. The latter causes the bucking voltage generated in the coil 55 to rise quickly to a voltage sufficient to reduce the voltage at the input terminals 26, 28 of the amplifier to zero. At this instant the driving force produced by the motor will also be zero. However, as the plunger 62 is further advanced due to the inertia and consequent overrunning of the load, the voltage supplied to the amplifier input terminal reverses in phase and increases in magnitude, thereby producing a reverse torque in the motor 12, thus bringing the load forcefully to a stop with a minimum amount of overtravel. It is to be particularly noted that in use of this scheme the braking force is magnetically applied to the motor rotor, and thus there is less strain on the gear train or regulator mechanism connected thereto.

After the kinetic energy has been dissipated, the bucking voltage then existing across the amplifier input terminals will serve to return the valve 22 to an "at rest" limit position in which the net voltage across the input terminals is substantially zero. It might be expected that the inertia of the mechanical drive would cause overswing in the opposite direction and consequent hunting about the limit position. As a practical matter, however, it has been found that even in low-friction systems substantially no hunting occurs after the first cycle of movement.

As the temperature is corrected and the bimetal 36 in the thermostat moves towards its central position, the voltage from the bridge is reduced and thus is exceeded by the voltage from the active limit stop secondary coil 55. This causes the motor 12 to be driven in the opposite direction, resulting in the shaft 21 and valve 22 being gradually eased away from the limit position. As the plunger on the arm 61 is gradually withdrawn, the voltage derived from the limit stop will become substantially zero and, from then on, further movement of the motor 12 will occur only when the control voltage from the thermostat passes through zero and builds up in the opposite sense. In short, the operation of the system, after the arm 61 moves away from the limit stop coils, is the same as in a conventional floating system.

Aside from serving as a protective device the limit stop includes a number of advantages which may not be immediately apparent. For example, if the valve 22 should tend to stick in its limit position for any reason whatsoever, a large restoring voltage, derived from the active one of the secondary coils 55, 56 will cause the motor to exert a large torque in a direction to cause the parts to break free. This may be verified by assuming that the bimetal strip 36 moves from an off-center position toward its central position as a result of heat being correctively applied to, or withdrawn from, the chamber. This will cause the voltage from the bridge to be gradually reduced to zero. If the valve 22 and arm 61 coupled thereto does not move from its limit position, the voltage induced in the active secondary winding will be unopposed and thus fully effective to cause breakaway torque to be exerted by the motor. If the chamber temperature continues to rise beyond the desired value, the voltage of the thermostat bridge will be added to that of the secondary winding and further increase the breakaway torque. This is contrasted with conventional floating systems not embodying my improvement in which the bimetal 36 would have to move to an extreme opposite position before any substantial torque would be developed by the motor.

In the above discussion it has been assumed that the limit stop voltage is produced only when the arm 61 reaches one or the other of its limits of movement and that the voltage gradient (volts per degree of movement) is appreciable only in the narrow limit range. If desired, however, without departing from the invention, the primary and secondary coils, instead of being flat and pie-wound, may be distributed over a larger arc along the path of movement of the cooperating plunger, 62 or 64. Or, alternatively, the plungers may be somewhat elongated so that a gradually increasing bucking voltage is induced at an earlier point in the path of movement of the arm 61. In either event movement of the valve toward one of its limit positions will be resisted. Stated another way, it will be necessary for the temperature to depart considerably from its desired predetermined value for the valve 22 to be moved to the full "on" or full "off" position. The latter in no way changes the floating control characteristics of the system in the neighborhood of the desired temperature. Such arrangement does, however, greatly reduce the violence of control and the severe hunting associated with a floating system resulting, for example, upon sudden withdrawal of heat from the chamber being controlled or where there is a lag in the supplying of heat. It will readily be appreciated by one skilled in the art that the plungers may be so related to the coils they engage that the voltage gradient may be caused to increase as the plunger is fully advanced. In this way the limit stop performs a dual function: it positively limits movement of the controlled element and improves the control of temperature under all conditions normally encountered in a domestic or other type of heating system.

Figure 4:
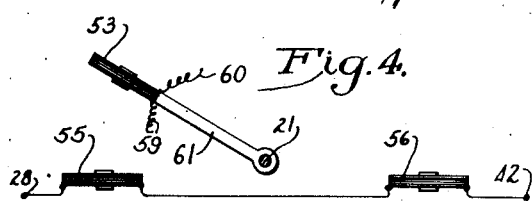
Fig. 4 is a fragmentary view showing modification of the device disclosed in Fig. 1 in which the limit stop coils are relatively movable.

Although the invention has been described in connection with stationary coils, it will be understood that relatively movable primary and secondary coils may be employed while maintaining many of the advantages of the preferred embodiment already set forth. One possible arrangement of this type is shown in Fig. 4. The secondary coils 55, 56, and which are preferably pie-wound, are connected in the same manner as disclosed in Fig. 1. In the present modification, however, a common primary coil 53 having terminals 59, 60 is mounted on the movable arm 61 so that it is brought into coupled engagement with the secondary coils at the alternative limit positions. The coils may, if desired, be provided with slugs of magnetic core material to increase the voltage gradient.

While the inductive limit stop constitutes an improvement over limit switches from a performance standpoint, it is important to note that it may be used where switches are entirely impracticable. For example, the limit stop arm 61 and its associated coils 52—56 may be submerged in liquid or located in corrosive or explosive atmospheres without risk and without recourse to complicated and expensive sealing arrangements. Or, if desired, the movable element may be kept separate from the coils by a non-magnetic wall or barrier. All of these features enhance the utility of the stop in already installed control systems.

Capacitive voltage source

Figure 2:
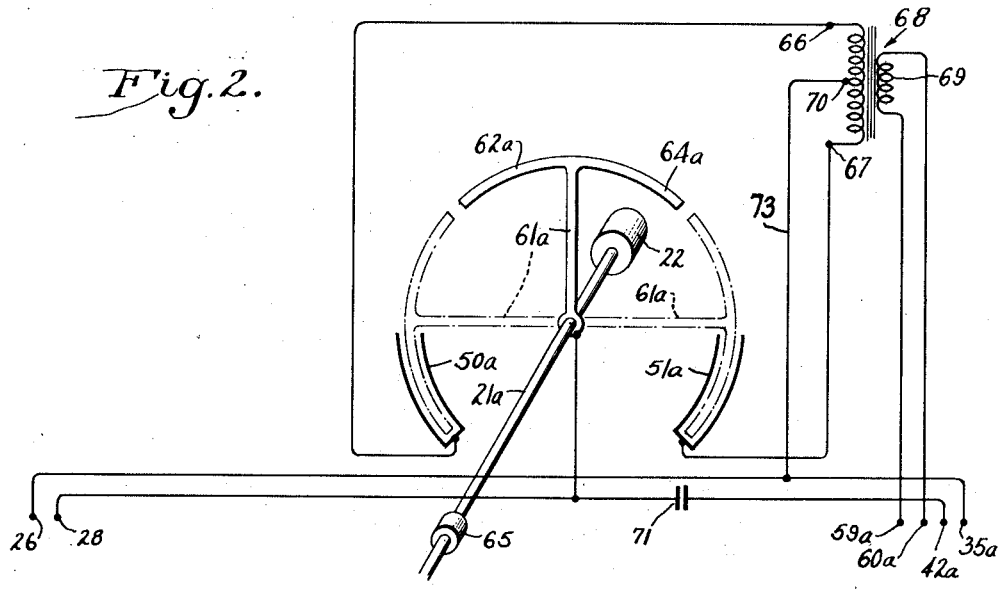
Fig. 2 shows a modified limit stop for use with a portion of the circuit shown in Fig. 1 and employing a capacitor voltage source.

Having understood the inductive arrangement discussed above, attention may next be given to an alternative construction in which the auxiliary voltage source employs capacitive rather than inductive coupling. One manner in which capacitive coupling may be used to limit the position of the driven shaft is shown in Fig. 2. For the sake of convenience the thermostat, amplifier, and motor may be considered to be the same as disclosed in Fig. 1, the revised portion of the circuit being connected thereto by correspondingly numbered terminals carrying the subscript "a." Wherever possible, components performing a corresponding function are designated by corresponding numerals.

It will be noted that the driven shaft 21a carries a limit stop arm 61a which is preferably insulated from the remainder of the system by an insulating coupling 65 or the like. Mounted at the end of the arm 61a are a pair of movable capacitor plates 62a, 64a which are coupled alternatively with capacitor stator plates 50a, 51a located at the desired limit positions. Voltage is applied to the stator plates 50a, 51a from opposed terminals 66, 67 of a transformer 68. The primary 69 of the transformer is connected to the supply line via terminals 59a, 60a. A connection 70 on the secondary of the transformer is connected to the amplifier input terminal 26 to form one of the output terminals of the limit stop. The other terminal 28 is connected to the movable capacitor plates 62a, 64a so that the output voltage thereof is applied in parallel to the amplifier input terminals. Since the bridge circuit feeding the terminals 35a, 42a is normally of considerably lower impedance than the capacitive circuit just discussed, it is desirable to isolate the two circuits. This is accomplished in the present instance by putting a capacitor 71 of, say, one-tenth microfarad in series with at neast one of the terminals 35a, 42a.

In a manner completely analogous to the preceding embodiment, movement of the limit stop arm 61a into one or the other of the extreme positions produces an increased bucking voltage which, superimposed upon the control voltage from the thermostat, serves to bring the motor 12 to a stop. As in the case of the arrangement shown in Fig. 1, the amount of bucking voltage is adjustable by merely positioning the potentiometer 58 connected to the supply line 17. Also, if desired, the opposed capacitor plates may be bent with respect to one another in order to vary the rate of increase, or in other words, the gradient, of the bucking voltage, such gradient conveniently being determined for the existing conditions by trial and adjustment, noting the setting at which the load is brought to a stop within a narrow limit region and without objectionable hunting.

Resistor voltage source

Figure 3:
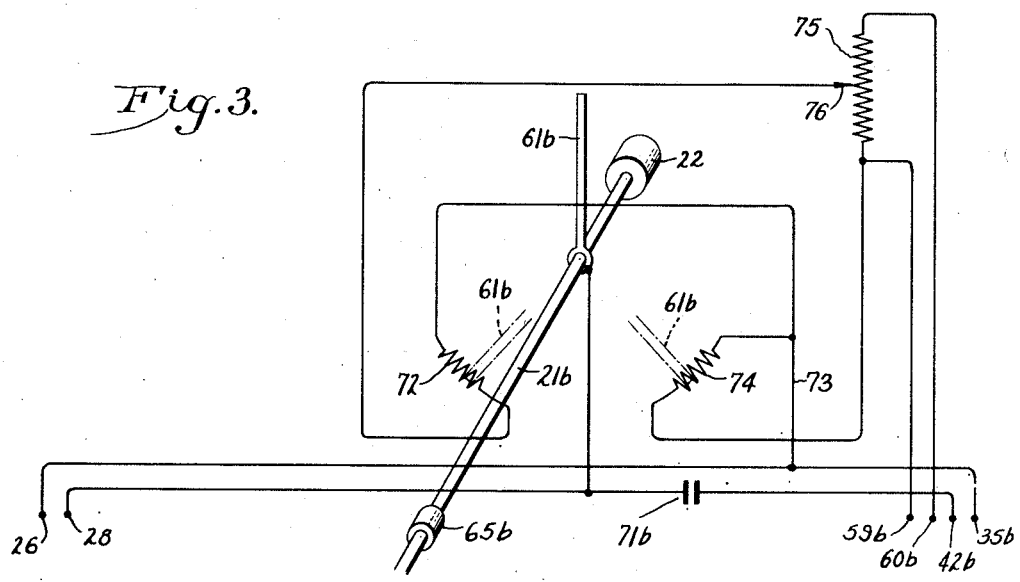
Fig. 3 is another embodiment of the limit stop in which the desired limiting voltage is derived from auxiliary variable resistors.

In Fig. 3 the teachings previously outlined are embodied in a servo limit stop which employs resistor elements for detecting excess angular displacement of the driven shaft. To facilitate understanding of this modification and to show the similarity between this arrangement and that disclosed in Figs. 1 and 2, corresponding reference numerals are used wherever possible with the subscript "b." In accordance with one of the aspects of the present invention, an auxiliary bucking voltage is produced as the driven shaft 21b approaches its respective limit positions, the bucking voltage being derived from bucking voltage resistors which are included in the circuit at the respective limits of movement. In the present instance the bucking voltage resistors are designated 72, 74 respectively and are engaged by a slider 61b on the shaft 21b. The bucking voltage resistors are supplied from an adjustable source of voltage, which may be a potentiometer 75 having a slider 76 thereon. In the same manner as previously discussed, the driven shaft 21b is insulated by a coupling 65b, and a capacitor 71b is employed to raise the impedance of the low impedance leg of the parallel circuit feeding into the amplifier terminals 26, 28.

In operation, any tendency for the driven shaft 21b to advance too far in either direction is immediately accompanied by a rapidly rising bucking voltage which not only insures that the load is stopped within the narrow limit region but serves to effect dynamic braking of the load upon any tendency to overtravel just as in the case of the first two embodiments of the invention.

In the capacitive and resistive embodiments of the invention described immediately above, the limit stop voltage is superimposed on the main control voltage from the thermostat 10 by a connection which causes the voltage to be added in parallel. It will be apparent to one skilled in the art that adding the voltages serially rather than in parallel could be accomplished without departing from my teachings. That is to say, the voltages derived from the limit stop and from the thermostat could be added together just as in the inductive embodiment illustrated in Fig. 1. The latter may be simply accomplished in Figs. 2 and 3 by applying the limit stop voltage across the terminals of the capacitor 71 or 71b. In Fig. 2 this may be done merely by connecting the single lead 73 from point 70 on the transformer 68 to the terminal 42a instead of to the terminals 35a as illustrated. In a completely analogous manner, Fig. 3 may be modified by disconnecting the lead 73 shared in common by the resistors 72, 74 from terminal 35b and connecting it instead to terminal 42b. After thus reconnecting the lead 73, the capacitor 71 or 71b is no longer necessary and may be omitted.

While the invention for the sake of simplicity has been applied to a temperature control system, it will be readily appreciated by one skilled in the art that it is by no means so limited. Thus the bimetal 36 may, if desired, be replaced by a bellows for the detection of pressure conditions, by a hygrometer for detecting humidity and the like, the controlled element 22 being in each instance suitably connected to means for correctively changing the condition. It will be apparent, too, that while the limit stop is ideally suited to a floating system, it may be readily used, without departing from my teachings, with a proportioning system or, in fact, to any electric control system in which an A. C. control voltage is utilized for the driving of a responsive motor and in which it is desired to prevent jamming of the mechanism driven thereby at its limits of travel. It will be understood by one skilled in the art that the term "control point" as employed in the following claims is not limited to a single value of the condition to be maintained. In a practical control system of the floating type the "control point" covers a narrow range or band of values of the condition.

I claim as my invention:

1. In a condition controlling system of the floating type, the combination comprising, a motor, an amplifier for supplying current thereto, means including a condition-responsive device for producing a variable control voltage for said amplifier, said condition-responsive device being the sole source of such control voltage so that said motor tends to be driven toward a limit position as long as the condition deviates from the desired value, means including a condition regulator operated by said motor for causing a corrective change in said condition, a source of bucking voltage, and means for causing said bucking voltage to be substantially zero over the normal range of movement of said motor but actuated by said motor as the latter moves into said limit position for superimposing a sharply increasing amount of said bucking voltage on said control voltage, said bucking voltage being greater than the available voltage from said condition-responsive device to minimize overtravel and insure stoppage of said motor and said regulator before reaching their limit of mechanical movement.

2. In a condition controlling system of the floating type, the combination comprising, a motor, an amplifier for supplying current thereto, means including a condition-responsive device for producing a variable control voltage for said amplifier, said condition-responsive device being the sole source of such control voltage so that said motor tends to be driven toward one of its opposite limit positions as long as the condition deviates from the desired value, means including a condition regulator operated by said motor for causing a corrective change in said condition, first and second sources of bucking voltage, and means for causing said bucking voltage to be substantially zero over the normal range of movement of said motor and regulator and for superimposing on said control voltage a sharply increasing amount of said bucking voltage from said first and second sources upon said regulator moving into its respective limit positions, the available bucking voltage from said sources being opposite in sense and greater than the voltage from said condition-responsive device to minimize overtravel and insure stoppage of said motor before it reaches its limit of mechanical movement.

3. In a floating control system for a condition regulator, the combination comprising, an A. C. motor arranged to drivingly position said regulator and having a single phase-responsive control winding thereon, means including a condition-responsive device for producing a control voltage which varies in magnitude and phasing respectively as the condition varies in magnitude and direction from a desired control point so that the motor is energized for driving in one direction or the other as long as the condition is not at the desired control point, a source of A. C. bucking voltage coupled to the phase-responsive control winding on said motor, a limit stop member coupled for movement with said condition regulator for causing the bucking voltage to be zero over the normal range of regulating movement and for causing said bucking voltage to build up sharply such as to oppose the existing control voltage, the maximum available bucking voltage being such as to exceed at all times the available voltage from the condition-responsive device so as to insure de-energization of the motor prior to said regulator reaching its limit of mechanical movement.

4. In a floating control system for a condition regulator, the combination comprising, an A. C. motor arranged to drivingly position said regulator and having a single phase-responsive control winding thereon, an amplifier for energizing the control winding, means including a condition-responsive device for feeding into said amplifier a control voltage which varies in magnitude and phasing respectively as the condition varies in magnitude and direction from a desired control point, said condition-responsive device being the sole source of variable control voltage for said amplifier so that said motor is energized for driving in one direction or the other as long as the condition deviates from said control point, first and second sources of A. C. bucking voltage connected in series with the condition-responsive device, means including a limit stop member coupled for movement with said condition regulator for causing said sources of bucking voltage to be ineffective over the normal range of regulating movement while causing bucking voltage to be fed from said sources with sharp buildup at the respective limits of regulating movement and with a phasing such as to oppose the same control voltage which was effective to drive the regulator toward its limit of movement thereby to insure de-energization of the motor prior to said regulator reaching its limit of mechanical movement.

5. In a floating control system for a condition regulator, the combination comprising, an A. C. motor arranged to drivingly position said regulator and having a phase-responsive control winding thereon, an amplifier having its output feeding into said control winding, means including a condition-responsive device connected to the input of said amplifier for supplying thereto a control voltage which varies in magnitude and phasing respectively as the condition varies in magnitude and direction from a desired control point, said condition-responsive device being the sole source of variable control voltage for said amplifier so that said motor tends to be driven in one direction or the other as long as the condition-responsive device indicates a deviation from said control point, first and second sources of A. C. bucking voltage connected to the input of said amplifier, a limit stop member coupled to said condition regulator for movement therewith, said sources of bucking voltage being arranged for progressive engagement by said limit stop member with resultant sharp buildup of bucking voltage only at the limit positions thereof while being effectively out of engagement over the normal range of regulating movement to enable a floating characteristic over said normal range of movement while preventing the regulator from being forceably urged into a mechanically stopped condition by said driving motor.

EDGAR D. LILJA.

REFERENCES CITED

The following references are of record in the file of this patent:

UNITED STATES PATENTS

| Number | Name | Date |
| --- | --- | --- |
| 1,958,245 | Mittag et al. | May 8, 1934 |
| 1,973,279 | Bernarde | Sept. 11, 1934 |
| 2,305,878 | Krusmann et al. | Dec. 22, 1942 |
| 2,322,498 | Zeitlin | June 22, 1943 |
| 2,464,548 | Bancroft | Mar. 15, 1949 |